Figure 2:
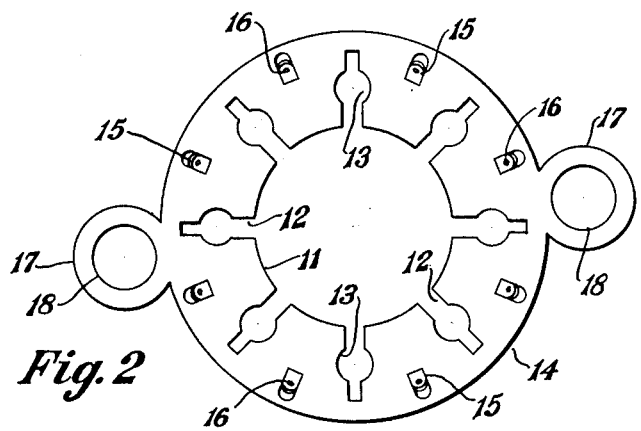

May 9, 1944.　　　　J. ARMEL　　　　2,348,511

COMMUTATOR AND PROCESS OF MANUFACTURE

Filed Sept. 1, 1942　　　2 Sheets-Sheet 1

Inventor
Jack Armel
By Frease and Bishop
Attorneys

May 9, 1944.  J. ARMEL  2,348,511
COMMUTATOR AND PROCESS OF MANUFACTURE
Filed Sept. 1, 1942  2 Sheets-Sheet 2

Inventor
Jack Armel
By Frease and Bishop
Attorneys

Patented May 9, 1944

2,348,511

UNITED STATES PATENT OFFICE 2,348,511

COMMUTATOR AND PROCESS OF MANUFACTURE

Jack Armel, Alliance, Ohio, assignor to The Alliance Manufacturing Company, Alliance, Ohio, a corporation of Ohio Application September 1, 1942, Serial No. 456,861

13 Claims. (Cl. 171—321)

The invention relates to commutators for electric motors, dynamos and similar electrical machines, and more particularly to a simple and novel construction of commutator and the process of manufacture thereof.

Under present practice commutators are ordinarily constructed of a plurality of wedge-shape or segmental, copper bars mounted in spaced relation in an insulating body. Such construction requires considerable machine work in the formation of the segmental bars and also necessitates a slow and tedious operation in the assembling of the copper bars in the insulating body, making the cost of a commutator relatively expensive.

The object of the present invention is to provide a commutator of simple construction which may be produced with a minimum of machine work and other labor.

Another object is to provide a commutator built up of a plurality of metal discs, each having a central opening and slots radiating therefrom, the body of the commutator being formed by molding a plastic insulation material within the center openings and slots of the discs.

A further object of the invention is to provide a laminated commutator of the character referred to having a tubular metal insert concentrically molded within the plastic body.

A still further object is the production of such a commutator in which the partially completed commutator formed of the stacked laminations with the plastic body molded therein is then turned in a lathe cutting away the peripheral portion of the laminated discs to the outer ends of the radial slots therein.

Still another object of the improvement is to provide a commutator of this character in which one lamination has a plurality of lugs punched therein to provide for soldering wires to the several bars of the completed commutator.

A still further object of the improvement is to provide a commutator of the character referred to which may be made from a tube or rod of copper or other suitable conducting metal, broached, or drilled and sawed to produce the concentric central opening and radial slots, said opening and slots then having plastic material molded therein and the partially completed product being turned down in a lathe to the outer ends of the radial slots.

The above objects together with others which will be apparent from the drawings and following description may be attained by constructing the improved commutator in the manner hereinafter described in detail and illustrated in the accompanying drawings, in which—

Figure 3:
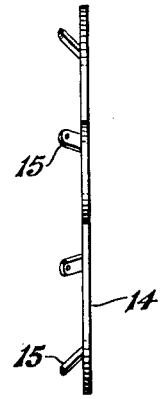
Figure 1:
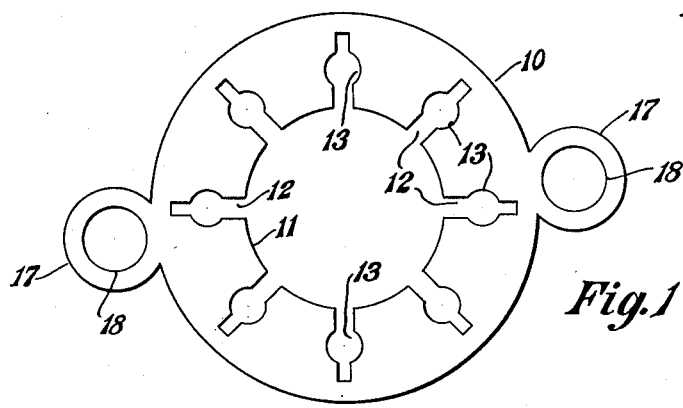
Figure 4:
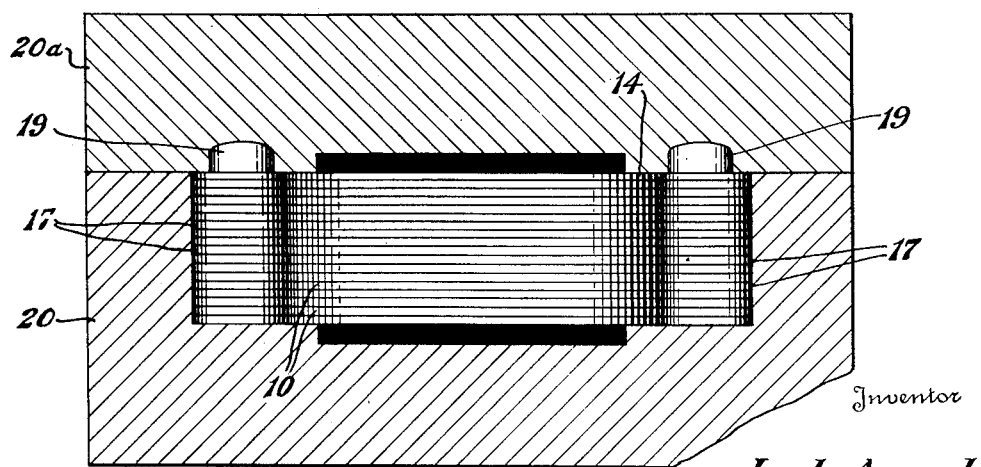
Figure 5:
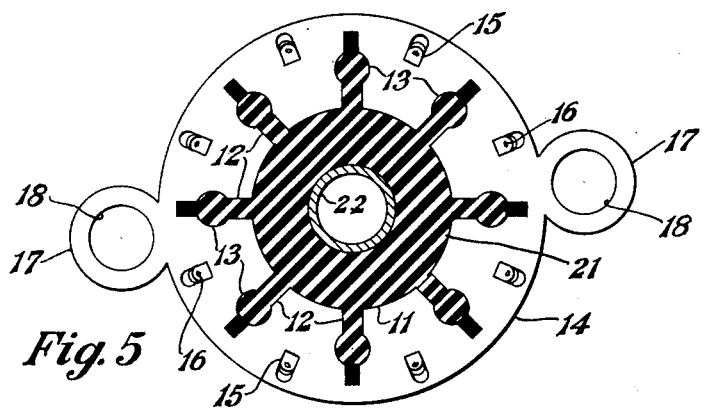
Figure 6:
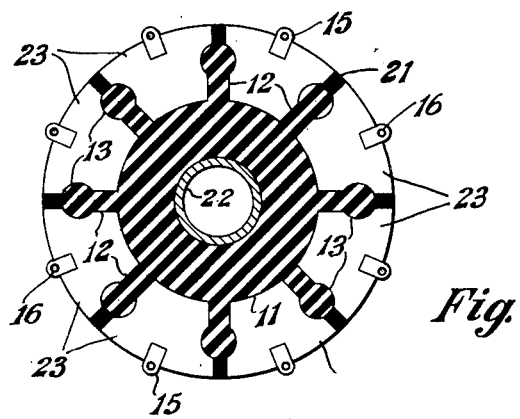
Figure 7:
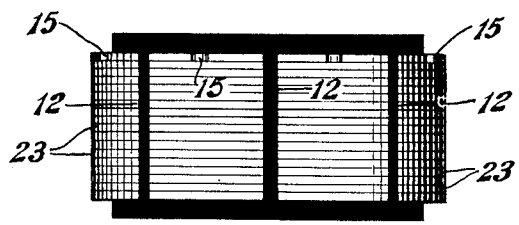

Figure 1 is a plan view of one of the copper laminations or discs going to make up the improved commutator;

Fig. 2, a similar view of a special lamination or disc having wire soldering lugs punched therein, one of which may be used in each commutator;

Fig. 3, an edge elevation of the disc shown in Fig. 2;

Fig. 4, an elevation of a plurality of the discs stacked upon line-up pins and located within a plastic mold or die;

Fig. 5, a top plan view partially in section of the partially completed commutator as it appears when removed from the mold;

Fig. 6, a similar view of the completed commutator after the periphery has been turned down in a lathe and the wire soldering lugs bent down into the plane of the end disc or lamination; and Fig. 7, a side elevation of the completed commutator shown in Fig. 6.

Similar numerals refer to similar parts throughout the drawings.

The commutator may be built up of a plurality of laminations or discs of copper or other suitable conductor metal, such as indicated generally at 10 in Fig. 1, each disc being of a diameter slightly larger than desired in the finished commutator and having a relatively large, concentric opening 11 from which radiate a plurality of radial slots 12 extending to a point spaced from the periphery of the disc.

The number of radial slots will vary according to the number of bars required in the commutator. Preferably each radial slot is provided with a retaining hole or enlargement 13 intermediate its extremities, the shape and location of said retaining hole being optional.

If desired, instead of building the commutator up of a plurality of these laminations, a single tube or rod, of suitable metal, broached or drilled and sawed to the cross sectional shape shown in Fig. 1, and of the desired length, may be substituted, and the process otherwise carried out as hereinafter described.

In order to provide soldering lugs upon the commutator, one lamination may be punched as indicated generally at 14 in Figs. 2 and 3, having the lugs 15 stamped therefrom. Otherwise the disc 14 is identical with the discs 10, and as shown in Fig. 2 the lugs 15 are equal in number to the radial slots 12 and are equally spaced between said slots. Each lug 15 is bent upward at an angle to the plane of the disc 14 and is preferably provided with an aperture 16 to accommodate a wire.

It will be obvious that instead of stamping the lugs 15 from the uppermost lamination of the commutator and punching apertures therein to attach the wires thereto, various means may be provided for accomplishing this purpose, such as punching apertures, slots or notches directly into the uppermost laminations for attaching wires thereto.

For the purpose of lining up the laminations, when they are stacked together to the proper thickness, ears 17 provided with apertures 18, may be formed at opposite sides of each disc to receive line-up pins. It will be evident that any number of ways may be used for stacking and lining up the discs, such as using certain of the retaining apertures 13 to receive the line-up pins, or by forming notches in the peripheries of the discs for this purpose.

In building up a commutator from the discs shown in Figs. 1 and 2 and above described, discs 10 are stacked together to the proper height, with one disc 14 upon the top thereof, all of the discs being lined up by the line-up pins 19 located through the apertures 18 of the ears 17. This stack of discs lined up in this manner is then placed in a separable plastic mold or die, indicated at 20 and 20a in Fig. 4.

At this point it should be noted that when using a broached, or drilled and sawed tube or rod, instead of the laminations, no line-up pins are required as the potential commutator is one solid piece.

Any suitable plastic insulation material, such for instance as the various synthetic resins or phenol formaldehydes is pressed in the mold or die, in sufficient quantity to entirely fill the central opening 11 and radial slots 12, including the retaining apertures or enlargements 13 and as the stack of laminations is under direct pressure within the die or mold this prevents the plastic material from getting between the laminations.

If desired a tubular metal insert may be concentrically located in the commutator to provide means for attaching the same to a shaft.

In Fig. 5 is shown a plan view of the partially completed commutator after it has been removed from the plastic die or mold. It will be seen that the plastic material indicated generally at 21 entirely fills the central opening 11 and the radial slots 12 and retaining apertures or enlargements 13, forming one solid insulation body. The tubular metal insert 22 is shown molded concentrically within the plastic body.

The laminations are thus all tightly bound together by the plastic body, forming an integral unit. This unit, as shown in Fig. 5, is then placed in a lathe and the periphery is turned down to the outer ends of the radial slots 12, separating the metal portion of the commutator into a plurality of separate, insulated segments 23, as shown in Figs. 6 and 7, each segment being insulated from the adjacent segments by the plastic ribs in the adjacent radial slots 12.

It will be seen that each segment 23 has one lug 15 thereon so that a wire may be connected to each segment. These lugs 15 are then flattened down into the plane of the upper disc, as shown in Figs. 6 and 7, so that they protrude beyond the periphery of the commutator in order to permit wires to be located through the apertures 16 therein and soldered to the lugs.

From the above it will be evident that a commutator for motors, dynamos, and similar electrical machines may be easily and readily manufactured with a minimum of machine work or other labor.

I claim:

1. A commutator comprising a cylindric body of moldable insulation material having a plurality of radial ribs extending outward therefrom, and a plurality of commutator segments arranged in circumferentially spaced apart relation around said insulation body and between the radial ribs thereon, each segment comprising a plurality of laminations, said insulation body and ribs being molded upon said segments, the outer ends of said ribs extending to the periphery of the commutator.

2. A commutator comprising a cylindric body of moldable insulation material having a plurality of radial ribs extending outward therefrom, and a plurality of commutator segments arranged in circumferentially spaced apart relation around said insulation body and between the radial ribs thereon, each segment comprising a plurality of laminations, said insulation body and ribs being molded upon said segments, the outer ends of said ribs extending to the periphery of the commutator and a lug upon one endmost lamination of each segment for attaching wires to the segments.

3. A commutator comprising a cylindric body of moldable insulation material having a plurality of radial ribs extending outward therefrom, there being an enlarged portion intermediate the extremities of each radial rib, and a plurality of commutator segments arranged in circumferentially spaced apart relation around said insulation body and between the radial ribs thereon, said insulation body and ribs being molded upon said segments, the outer ends of said ribs extending to the periphery of the commutator.

4. The method of making a commutator which comprises forming a member of conductor metal having a central opening therein and radial slots extending from the opening to a point spaced from the outer edge of the conductor member and retaining openings intermediate the ends of said slots, molding a plastic, insulation body within said central opening and integral, plastic, insulation ribs within said radial slots having enlarged portions within said retaining openings, and cutting away the outer portion of the conductor member to the outer ends of the insulation ribs, producing a plurality of spaced, insulated commutator segments surrounding the plastic, insulation body and separated from each other by the insulation ribs.

5. The method of making a commutator which comprises forming a plurality of similar discs of conductor metal, each disc having a central opening and a plurality of radial slots radiating from the central opening and extending to a point spaced from the periphery of the disc, stacking the discs upon each other in lined up position, molding a plastic insulation body within the central openings and integral, plastic, insulation ribs within the radial slots, and cutting away the outer portions of the discs to the outer ends of the insulation ribs, producing a plurality of spaced, insulated commutator segments surrounding the plastic, insulation body and separated from each other by the insulation ribs.

6. The method of making a commutator which comprises forming a plurality of similar discs of conductor metal, each disc having a central opening and a plurality of radial slots radiating from the central opening and extending to a point spaced from the periphery of the disc and retaining holes in said slots, then stacking the discs upon each other in lined up position, then molding a plastic insulation body within the central openings and integral, plastic, insulation ribs within the radial slots having enlarged portions within said retaining holes, and then cutting away the outer portions of the discs to the outer ends of the insulation ribs, producing a plurality of spaced, insulated commutator segments surrounding the plastic, insulation body and separated from each other by the insulation ribs.

7. The method of making a commutator which comprises forming a plurality of similar discs of conductor metal, each disc having a central opening and a plurality of radial slots radiating from the central opening and extending to a point spaced from the periphery of the disc, stacking the discs upon each other in lined up position, molding a plastic insulation body within the central openings with a tubular metal insert therein and integral, plastic, insulation ribs within the radial slots, and cutting away the outer portions of the discs to the outer ends of the insulation ribs, producing a plurality of spaced, insulated commutator segments surrounding the plastic, insulation body and separated from each other by the insulation ribs.

8. The method of making a commutator which comprises forming a plurality of similar discs of conductor metal, each disc having perforated ears at its periphery and having a central opening and a plurality of radial slots radiating from the central opening and extending to a point spaced from the periphery of the disc, then stacking the discs upon each other in lined up position with line-up pins located through the perforated ears, then molding a plastic insulation body within the central openings and integral, plastic, insulation ribs within the radial slots, and then cutting away the outer portions of the discs to the outer ends of the insulation ribs, producing a plurality of spaced, insulated commutator segments surrounding the plastic, insulation body and separated from each other by the insulation ribs.

9. The method of making a commutator which comprises forming a plurality of similar discs of conductor metal, each disc having a central opening and a plurality of radial slots radiating from the central opening and extending to a point spaced from the periphery of the disc, one of the discs having lugs stamped therefrom between said radial slots, then stacking the discs upon each other in lined up position, then molding a plastic insulation body within the central openings and integral, plastic, insulation ribs within the radial slots, and then cutting away the outer portions of the discs to the outer ends of the insulation ribs, producing a plurality of spaced, insulated commutator segments surrounding the plastic, insulation body and separated from each other by the insulation ribs.

10. The method of making a commutator which comprises forming a plurality of similar discs of conductor metal, each disc having a central opening and a plurality of radial slots radiating from the central opening and extending to a point spaced from the periphery of the disc, one of the discs having upwardly bent lugs stamped therefrom between said radial slots, then stacking the discs upon each other in lined up position, then molding a plastic, insulation body within the central openings and integral, plastic, insulation ribs within the radial slots, then cutting away the outer portions of the discs to the outer ends of the insulation ribs, producing a plurality of spaced, insulated commutator segments surrounding the plastic, insulation body and separated from each other by the insulation ribs and then flattening said lugs down into the plane of said disc from which they are stamped so that the lugs protrude beyond the periphery of the commutator.

11. A commutator comprising a cylindric body of moldable insulation material having a plurality of radial ribs extending outward therefrom, and a plurality of commutator segments arranged in circumferentially spaced apart relation around said insulation body and between the radial ribs thereon, each segment comprising a plurality of laminations.

12. A commutator comprising a cylindric body of moldable insulation material having a plurality of radial ribs extending outward therefrom, there being an enlarged portion intermediate the extremities of each radial rib, and a plurality of commutator segments arranged in circumferentially spaced apart relation around said insulation body and between the radial ribs thereon, each segment comprising a plurality of laminations, said insulation body and ribs being molded upon said segments, the outer ends of the ribs extending to the periphery of the commutator.

13. A commutator comprising a cylindric body of moldable insulation material having a plurality of radial ribs extending outward therefrom, there being an enlarged portion intermediate the extremities of each radial rib, and a plurality of commutator segments arranged in circumferentially spaced apart relation around said insulation body and between the radial ribs thereon, each segment comprising a plurality of laminations, said insulation body and ribs being molded upon said segments, the outer ends of the ribs extending to the periphery of the commutator and a lug upon one endmost lamination of each segment for attaching wires to the segments.

JACK ARMEL.